United States Patent [19]
Smith

[11] 4,114,292
[45] Sep. 19, 1978

[54] MATCH UP GAME

[75] Inventor: Stanley E. Smith, Gladwin, Mich.

[73] Assignee: The Raymond Lee Organization, Inc., New York, N.Y. ; a part interest

[21] Appl. No.: 827,863

[22] Filed: Aug. 26, 1977

[51] Int. Cl.² .............................................. G09B 7/10
[52] U.S. Cl. ................................................... 35/9 B
[58] Field of Search ......................... 35/9 R, 9 B, 9 C

[56] References Cited

U.S. PATENT DOCUMENTS

| | | | |
|---|---|---|---|
| 1,949,783 | 3/1934 | Cleaver | 35/9 C |
| 2,104,718 | 1/1938 | Dougherty | 35/9 C |
| 2,947,087 | 8/1960 | Arnold et al. | 35/9 B |
| 2,982,031 | 5/1961 | Bardelli | 35/73 |
| 3,100,352 | 8/1963 | Boissevain | 35/9 C |
| 3,427,028 | 2/1969 | Abrahamsen | 35/73 X |
| 3,675,341 | 7/1972 | Matsumoto | 35/9 B |
| 3,697,076 | 10/1972 | Vogel | 273/260 X |
| 3,701,205 | 10/1972 | Wolf | 35/9 G |
| 3,720,006 | 3/1973 | Boram et al. | 35/9 C |
| 3,758,961 | 9/1973 | Matsumoto | 35/9 A |
| 3,780,453 | 12/1973 | Hesener | 35/9 R X |
| 3,809,784 | 5/1974 | Munafo | 35/9 B |
| 3,834,042 | 9/1974 | Henry | 35/31 C X |
| 3,973,334 | 8/1976 | Sterritt | 35/9 C X |
| 4,011,664 | 3/1977 | Weisberg et al. | 35/9 B |

Primary Examiner—William H. Grieb
Attorney, Agent, or Firm—Daniel Jay Tick

[57] ABSTRACT

A match up game for answering questions from multiple choice answers indicates the correctness of an answer by illuminating a green lamp and indicates the incorrectness of an answer by illuminating a red lamp. The person answering the questions operates a switch indicating the question which is being answered and operates another switch which indicates the answer selected for such question.

1 Claim, 3 Drawing Figures

MATCH UP GAME

BACKGROUND OF THE INVENTION

The present invention relates to a match up game. More particularly, the invention relates to a match up game for answering questions from multiple choice answers and indicating the correctness and incorrectness of the answers.

Objects of the invention are to provide a match up game of simple structure, which is inexpensive in manufacture, used with facility and convenience, and functions efficiently, effectively and reliably to indicate answers to questions selected by a person being questioned in a manner whereby the questions and answers are readily changeable, so that memorization thereof is difficult.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The match up game of the invention is for answering questions from multiple choice answers and indicating the correctness and incorrectness of the answers.

Figure 2:
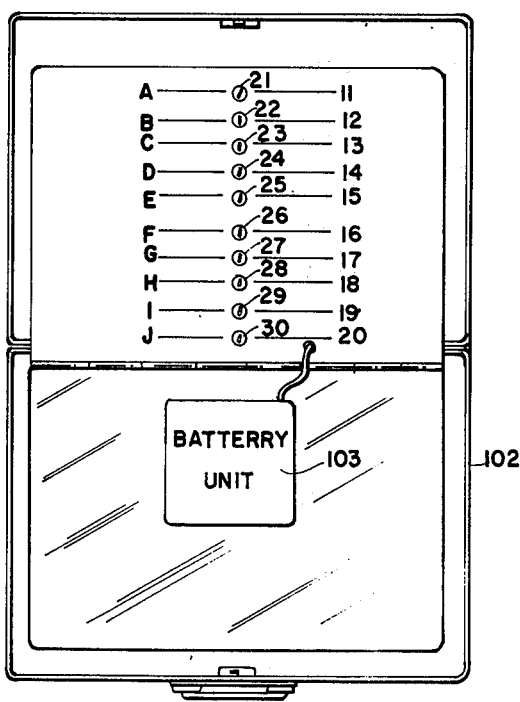
FIG. 2 is a schematic diagram of the match up game of FIG. 1.

The match up game of the invention comprises a list of questions and multiple choice answers for each of the questions, shown in FIG. 2. The questions are numbered 11, 12, 13, 14, 15, ... 20, to distinguish them from each other.

Figure 1:
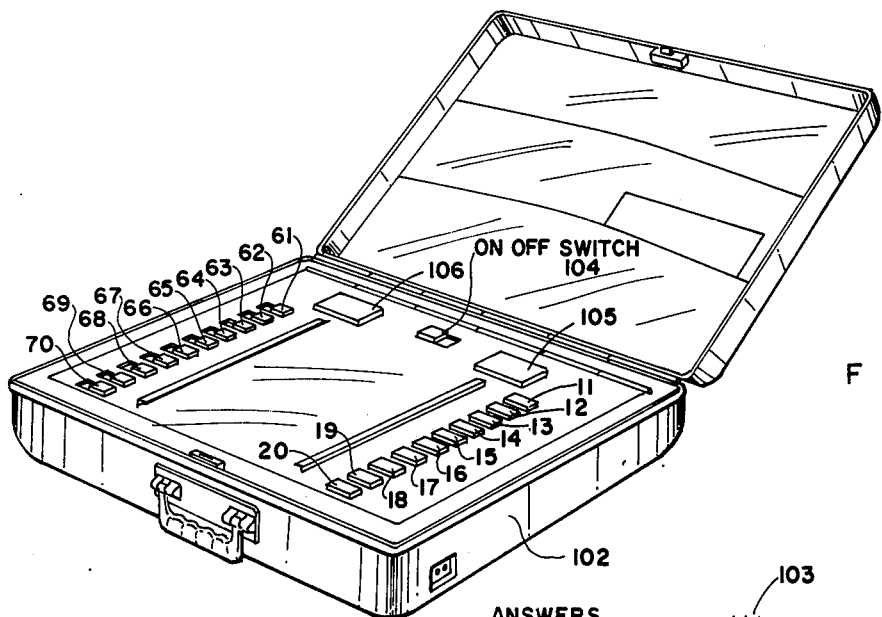
FIG. 1 is a perspective view of an embodiment of the match up game of the invention.

There are several sheets of questions and answers, and the entire match up game is preferably housed in an attache type case 102, shown in FIGS. 1 and 2.

Figure 3:
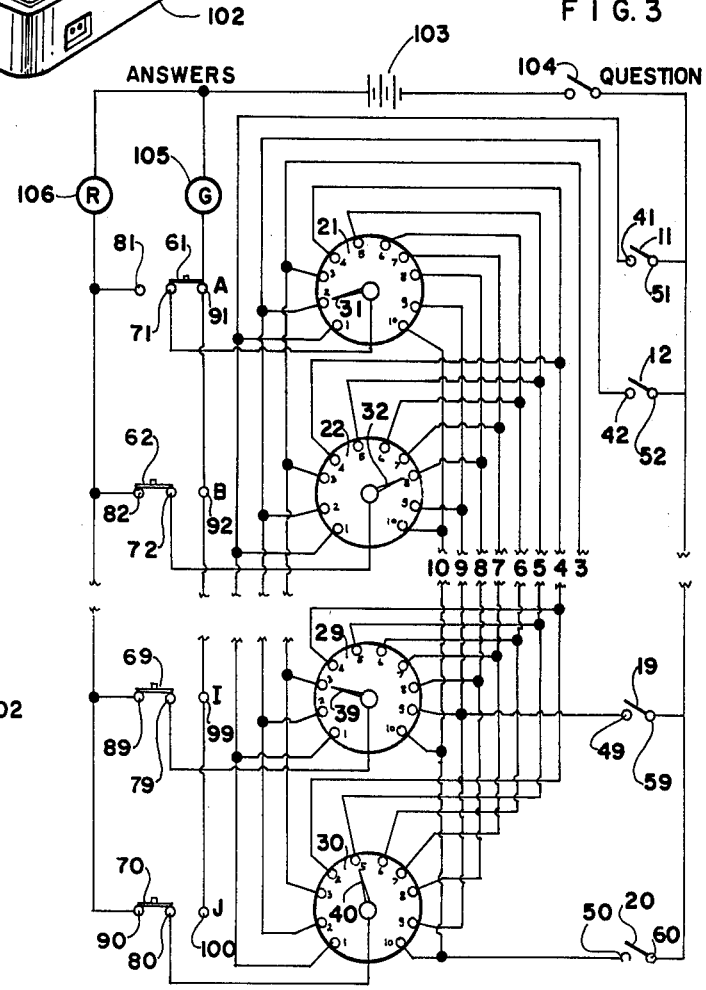
FIG. 3 is a circuit diagram of part of the match up game of the invention.

The match up game of the invention includes a plurality of rotary switches 21, 22, 23, 24, ... 29 and 30 (FIG. 3). Each of the rotary switches 21 to 30 has a plurality of electrical contacts 1 to 10 and a rotary switch arm, as shown in FIG. 3. The rotary switches 21 to 30 have rotary switch arms 31, 32, 33, ... 39 and 40, respectively, as shown in FIG. 3. Each of the rotary switches 21 to 30 is set with its switch arm in electrical contact with a selected one of its electrical contacts 1 to 10, in accordance with the correct answer to a corresponding question. Thus, as shown in FIG. 3, the match up game is preset, for a selected set of questions and answers, to indicate that the correct answer to question number 11 is choice No. 2, the correct answer to question number 12 is choice No. 8, the correct answer to question number 19 is choice No. 3 and the correct answer to question number 20 is choice No. 5.

A plurality of question switches 11 to 20 are numbered 11 to 20, respectively, in correspondence with the questions. The question switches 11 to 20 have first contacts 41, 42, 43, 44, ... 49 and 50, respectively, electrically connected to the electrical contacts 1 to 10 of the rotary switches 21 to 30. The question switches 11 to 20 also have second contacts 51, 52, 53, 54, ... 59 and 60.

A plurality of answer switches 61, 62, 63, 64, ... 69 and 70 are numbered in correspondence with the answers provided on the multiple answer sheet. Thus, the answer switch 61 is operated by the person answering the questions when he or she selects the answer A to the question. The answer switch 62 is operated by the person answering the questions when he or she selects the answer B to the question, and so on. The answer switches 61 to 70 have first center electrical contacts 71, 72, 73, 74, ... 79 and 80, respectively (FIG. 3), electrically connected to the rotary switch arms 31 to 40 of the rotary switches 21 to 30, respectively, as shown in FIG. 3. The answer switches 61 to 70 have first electrical contacts 81, 82, 83, 84, ... 89 and 90, and second electrical contacts 91, 92, 93, 94, ... 99 and 100, respectively, as shown in FIG. 3.

A source of electrical energy 103 which may be a commercial power source, but which is preferably a battery, has a negative polarity terminal electrically connected in common to the second contacts 51 to 60 of the question switches 11 to 20 via an ON-OFF switch 104 (FIG. 3).

A green lamp 105 has one terminal electrically connected to the positive polarity terminal of the source of electrical energy 103 and another terminal electrically connected in common to the second contacts 91 to 100 of the answer switches 61 to 70, respectively, as shown in FIG. 3.

A red lamp 106 has one terminal electrically connected to the positive polarity terminal of the source of electrical energy 103 and another terminal electrically connected in common to the first contacts 81 to 90 of the answer switches 61 to 70, respectively, as shown in FIG. 3.

Thus when the correct answer is selected by the person answering the questions via the corresponding answer switch 61 to 70, the green light 105 is energized. When an incorrect answer is selected by the person answering the questions, the red light 106 is energized.

While the invention has been described by means of a specific example and in a specific embodiment, I do not wish to be limited thereto, for obvious modifications will occur to those skilled in the art without departing from the spirit and scope of the invention.

Games of the type described in the present application are disclosed in the following U.S. Pat. Nos. 1,949,783, issued to Cleaver on Mar. 6, 1934, 2,104,718, issued to Dougherty on Jan. 4, 1938; 2,982,031, issued to Bardelli on May 2, 1961; 3,100,,352, issued to Boissevain on Aug. 13, 1963; 3,427,028, issued to Abrahansen on Feb. 11, 1969; 3,697,076, issued to Vogel on Oct. 10, 1972; 3,701,205, issued to Wolf on Oct. 31, 1972, 3,720,006, issued to Boram et al. on Mar. 13, 1973, 3,758,961, issued to Matsumoto on Sept. 18, 1973; 3,780,453, issued to Hesener on Dec. 25, 1973; 3,834,042, issued to Henry on Sept. 10, 1974 and No. 3,973,334, issued to Sterritton on Aug. 10, 1976.

I claim:

1. A match up game for answering questions from multiple choice answers and indicating the correctness and incorrectness of the answers, said match up game comprising a list of questions and multiple choice answers for each of the questions, the questions being numbered to distinguish them from each other and the answers being numbered to distinguish them from each other;

a plurality of rotary switches each having a plurality of electrical contacts and a rotary switch arm, each of the rotary switches being set with its switch arm in electrical contact with a selected one of its electrical contacts in accordance with the correct answer to a corresponding question;

a plurality of question switches numbered in correspondence with the question, each switch having a first contact electrically connected to one of the electrical contacts of each of the rotary switches and a second contact;

a plurality of answer switches numbered in correspondence with the answers each having a first center electrical contact electrically connected to the rotary switch arm of a corresponding one of the rotary switches, a first electrical contact and a second electrical contact;

a source of electrical energy having a first polarity terminal electrically connected in common to the second contacts of the question switches and a second polarity terminal;

a green lamp having one terminal electrically connected to the second polarity terminal of the source of electrical energy and another terminal electrically connected in common to the second contacts of the answer switches; and a red lamp having one terminal electrically connected to the second polarity terminal of the source of electrical energy and another terminal electrically connected in common to the first contacts of the answer switches whereby when the correct answer is selected via the corresponding answer switch the green light is energized and when an incorrect answer is selected the red light is energized.

* * * * *